United States Patent [19]

Lazzari et al.

[11] 4,204,315

[45] May 27, 1980

[54] METHOD OF PRODUCING A MAGNETIC TRANSDUCER DEVICE

[75] Inventors: Jean-Pierre Lazzari, Montfort-l'Amaury; Michel Helle, Marcq, both of France

[73] Assignee: Compagnie Internationale Pour l'Informatique CII-Honeywell Bull (Societe Anonyme), Paris, France

[21] Appl. No.: 2,465

[22] Filed: Jan. 10, 1979

Related U.S. Application Data

[62] Division of Ser. No. 899,383, Apr. 24, 1978.

[30] Foreign Application Priority Data

Apr. 29, 1977 [FR] France ............................ 77 13026

[51] Int. Cl.$^2$ ............................................. G11B 5/42
[52] U.S. Cl. .................................................. 29/603
[58] Field of Search ................... 29/603; 360/122, 113

[56] References Cited

U.S. PATENT DOCUMENTS 4,044,392  8/1977  Brock et al. ................... 29/603 X Primary Examiner—Carl E. Hall
Attorney, Agent, or Firm—Kerkam, Stowell, Kondracki & Clarke

[57] ABSTRACT

A magnetic transducer and method of operation is disclosed for removing the effect of interference magnetic fields present when detecting information magnetically coded on a carrier. The transducer is provided with a magnetoresistive compensating element disposed to develop a voltage in response to the interference magnetic fields equal to that developed across a magnetoresistive detecting element; however, the compensating element is positioned out of the magnetic leakage field of the coded information.

4 Claims, 7 Drawing Figures

FIG:1a
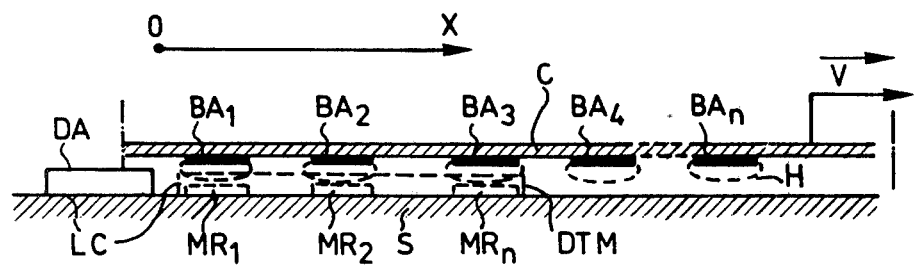
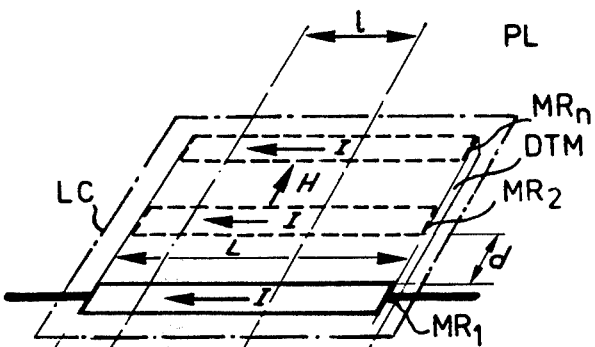
FIG:1b
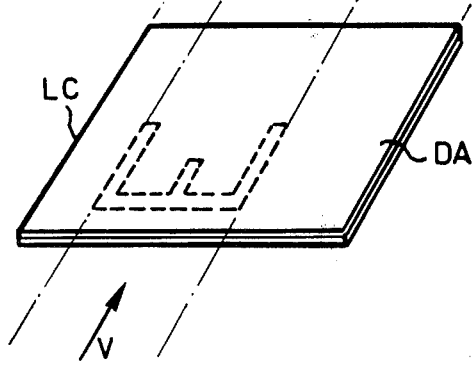
FIG:1

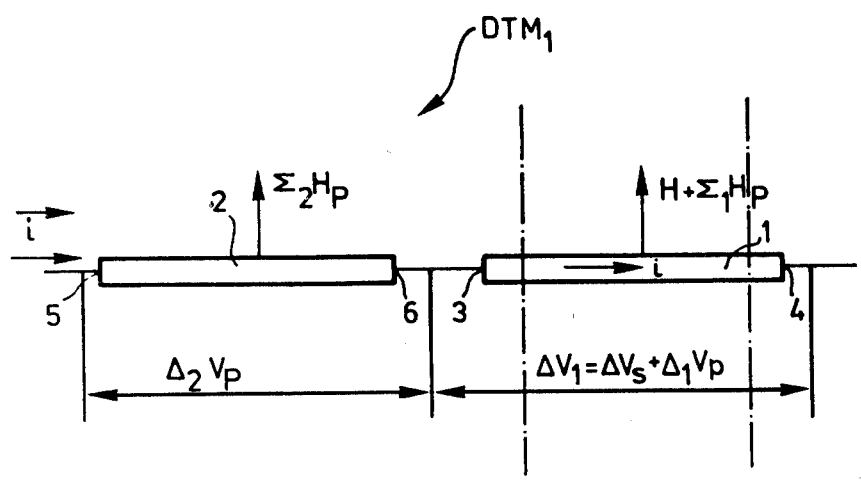
FIG: 2
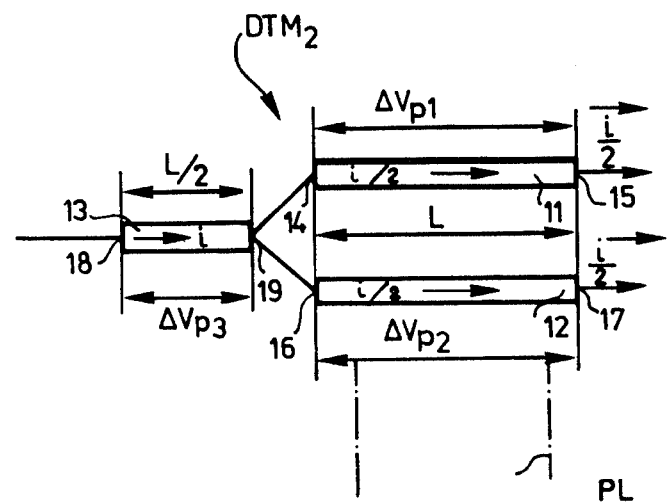
FIG: 3

FIG:4
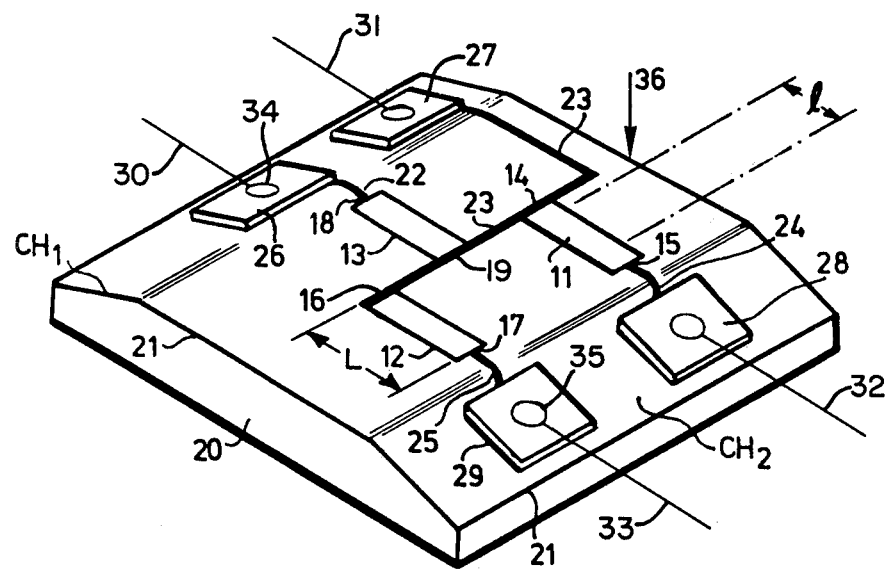
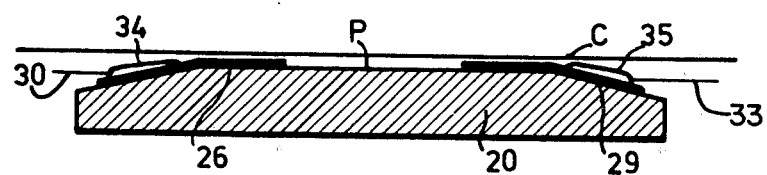
FIG: 5

METHOD OF PRODUCING A MAGNETIC TRANSDUCER DEVICE

This is a division of application Ser. No. 899,383, filed Apr. 24, 1978.

BACKGROUND OF THE INVENTION

1. Field of the Invention

The present invention relates to a magnetic transducer device for detecting coded magnetic information and to the method of producing such a device.

It is applicable in particular to devices for reading coded magnetic information such as check or card reading devices and magnetic tape units, etc.; however, for the sake of simplicity the invention will be described as it applied to a check reading device, with the understanding that the description is equally applicable to any other device for reading coded magnetic information.

2. Description of the Prior Art

It is known that present day data processing systems often include data infeed arrangements which employ carriers or slips bearing coded information. These carriers may take various forms, such as, for example, bank checks, post office checks, deposit or withdrawal slips, identification cards or credit cards, etc. In case of credit cards, this information frequently is contained in a strip across the front or back face of the card.

The information generally consists of a sequence of alpha-numeric characters printed on the slips, that is a sequence of letters of the alphabet, figures, punctuation marks, etc. which indicate, in the case where the slip is a check, for example, the number of the check or the account number of its drawer. Each character is formed by a set of bars composed of magnetic ink deposited on an insulating substrate. The number of bars, the distance between the bars, and their relative disposition are individual to each character and conform to known codes such as the CMC 7 code, for example. These bars are magnetized before being processed in the code reader.

Consideration will be given to a check and the corresponding data infeed device which is called a "check reader" as an illustrative example of an application to which the invention may be adapted. The check reader converts the coded magnetic information represented by the characters printed on the check into a succession of electrical signals. These electrical signals are translated to electronic shaping circuits which convert this series of electrical signals into a series of square-wave electrical pulses which are in turn transmitted to electronic circuits for recognizing the characters printed on the check. As soon as the pulses which correspond to this series of square-wave electrical pulses, which in turn correspond to the printed characters, have been decoded, that is to say the characters have been identified, it is possible to cause a calculating unit in the data processing system to which the check reader belongs to perform operations relating to the check such as debiting, crediting, updating the account of its drawer, etc.

In order that the object of the invention may be better understood, the following facts about magnetism should be noted:

To magnetize a magnetic material, the material is first subjected to a positive magnetic field whose strength is sufficient to saturate the material, that is to say, for the magnetic induction in the material to reach a limiting value $B_s$ as soon as the strength of the magnetic field reaches a certain value $H_s$. The magnetic field is then removed. There then remains a magnetic induction termed the residual induction ($+Mr$) which is other than zero and which is characteristic of the material. In other words, magnetizing a magnetic material amounts to saturating it magnetically.

A magnetic material which has been magnetized sets up a magnetic leakage field H in the immediate vicinity of its surface, and the magnetic flux of a magnetic field H through an area S is equal to the product of the strength of this field multiplied by the size of the area.

Generally, check readers comprise a magnetizing device and a magnetic transducer device. The magnetizing device is used to magnetize the bars forming the characters printed on the check in order to render the value and sense of the magnetic induction identical in all the bars since this is necessary because when the characters are printed on the check, either the induction in the bars is zero or else the value and sense of the magnetic induction varies from one bar to the next throughout the bars. Thus, the magnetic induction in the bars is equal to the residual induction of the magnetic ink when they are no longer subject to the magnetic field of the magnetizing device.

The magnetic transducer device is sensitive to the magnetic leakage field which is set up by the bars after they have been magnetized by the magnetizing device and emits an electrical signal in response to this magnetic leakage field. This signal is transmitted to the aforementioned electronic shaping circuits. In other words, it can be said that the magnetic transducer device enables the presence of the bars to be detected.

The check is moved by a mechanical transporting device and is positioned in the device in such a way that all the bars pass in front of the magnetizing device and in front of the magnetic transducer device in succession in close proximity thereto. The mechanical check transporter device may be operated either manually or by an electronic motor.

In present day practice, magnetic transducer devices are formed by a head consisting of a magnetic circuit which is provided with a wide air gap and around which is coiled a winding containing a large number of turns. The bars pass by the air gap at a very short distance from it so that it picks up the major proportion of the magnetic flux which is generated by the magnetic leakage field of the bars, via the magnetic circuit of the head. An electrical signal is then received at the terminals of the winding whose voltage is equal in absolute value to the variation, per unit of time, of the magnetic flux picked up by the magnetic circuit. In can be shown that this voltage is proportional to the speed of movement of the bars past the air gap. It follows that this voltage is sensitive on the one hand to the speed of movement and on the other hand to variations in it (for example, in the case of a check transporter device which is manually operated), which makes for inaccurate detection of the bars. Such a magnetic head needs care in manufacture and is relatively expensive and bulky.

Magnetic transducer devices having at least one magnetoresistor overcome these disadvantages. Magnetoresistors are electrical resistors which are deposited on a substrate of insulating material in the form of thin layers or films of very shallow depth (a few hundred Angstroms to a few microns thick) and whose resistance varies when they are subjected to the flux of a magnetic field. A measuring magnetoresistor R of this kind is connected to the terminals of a generator which ouputs a current I. When a bar passes in front of the magnetoresistor of the flux of the magnetic leakage field H causes a change $\Delta R$ in its resistance and thus a change $\Delta V = I \Delta R$ in voltage, which means that $\Delta V/V = \Delta R/R$, $\Delta R/R$ being termed the coefficient of magnecoresistance. This coefficient is generally a few percent and is very often negative.

The corresponding electrical signal is amplified and transmitted to the aforementioned shaping circuits. This signal is unaffected by the speed of movement of the bars.

In present day practice, magnetoresistive magnetic transducer devices include, for preference, two magnetoresistors for detecting the presence of bars which are deposited on a single insulating substrate and which are positioned a short distance d apart, the bars passing in front of each of the magnetoresistors in succession.

The distance d depends in particular on the width of the bars and the maximum and minimum allowable spacing between them. Such a device is described, for example, in an article by G. E. Moore, Jr. and Lijcote entitled "Dual Strips Magnetoresistive Read Heads for Speed-Insensitive Tape Readers" which was published in the journal "IEEE Transactions of Magnetics," Vol. 12, Number 6 of November 1976.

Such magnetoresistive devices have the drawback of being extremely sensitive to magnetic and electromagnetic fields other than the magnetic leakage field H of the bars. Such fields will be referred to generally in what follows as magnetic interference fields. Among them may be mentioned the magnetic fields which are set up by electrical apparatus of all kinds and the magnetic field of the earth.

Even if these fields are weak and are less than the magnetic leakage field H of the bars, their effect on the magnetoresistors for detecting the presence of the bars is nevertheless to disturb the electrical output signal from the resistors due to the field H by generating by no means negligible electrical signals termed "noise" signals. In other words, the overall electrical output signal from the magnetoresistors is formed by the electrical "noise" signals due to the interference fields, superimposed on the signal due to the leakage field H of the bars. As a result there may be a considerable risk of errors occurring in detecting the presence of the bars.

SUMMARY OF THE INVENTION

The present invention enables this drawback to be overcome by arranging a compensating magnetoresistor such that it is positioned close to the magnetoresistors for detecting the presence of the bars and off the path followed by the bars when they pass in front of the magnetoresistors. In this way, the compensating magnetoresistor is subject to the same interference magnetic fields as the detecting magnetoresistors. The output signal from the compensating magnetoresistor is subtracted from the output signal from each detecting magnetoresistor, and there is obtained a bar detection signal which is associated with each detecting magnetoresistor and which is unaffected by the interference magnetic fields.

In this way there is produced a simple and inexpensive magnetic transducer device and method for detecting coded magnetic information whose reliability in detecting the presence of bars is greater than that of known transducer devices and detection method. It can be shown that in the extreme case it is possible to manage with only one compensating magnetoresistor.

In accordance with the invention, there is provided a magnetic transducer device for detecting coded magnetic information. The transducer device includes at least one magnetoresistive element for detecting the coded information which is arranged on an insulating substrate. The coded magnetic information passes in front of the magnetoresistive element parallel to its surface and a compensating magnetoresistive element is arranged, close to the detecting magnetoresistive element, in such a way that it is not subject to the magnetic leakage field of the coded magnetic information, but is subject to the same interference magnetic fields as the detecting element. The voltages of the electrical output signals emitted by the said detecting and compensating elements in response to the action on them of the interference magnetic fields being substantially the same and these signals may be subtracted from such other to cancel the effects of interference magnetic fields and obtain the bar detection signals.

BRIEF DESCRIPTION OF THE DRAWINGS

Other features and advantages of the invention will be apparent from the following description, which is given by way of non-limiting example with reference to the accompanying Figures. In the drawings:

FIG. 1 shows the relative disposition of check bearing bars of magnetic ink and a prior-art magnetoresistive magnetic transducer device for detecting the bars made up on FIG. 1a and FIG. 1b, FIG. 1a being a side view and FIG. 1b being a perspective view.

FIG. 2 is a block diagram of a magnetic transducer device according to the invention having a single magnetoresistor for detecting the presence of bars.

FIG. 3 is a block diagram of a magnetic transducer device according to the invention having two magnetoresistors for detecting the presence of bars.

FIGS. 4 and 5 show a preferred embodiment of the magnetic transducer device of which the block diagram appears in FIG. 3, FIG. 4 being a three-quarter perspective view and FIG. 5 being a sectional view from the side.

DESCRIPTION OF THE PREFERRED EMBODIMENTS

In FIG. 1 is seen, in cross section, a carrier or slip C such as a bank check which is moving along an axis O (from left to right as viewed in FIG. 1a) at a speed V above a check reader LC, the slip being transported by a mechanical check transporting device which is, for example, manually operated. For the sake of simplicity this device has not been shown in FIG. 1. The slip C carries bars $BA_1$, $BA_2$, $BA_3$, $BA_4 \ldots BA_n$, of magnetic ink which forms part of the characters printed on the slip. The path followed by the characters when they move above the check reader LC defines a reading track PL of width l.

The check reader LC includes a magnetizing device DA, represented by a rectangle in FIG. 1, mounted on substrate S and which serves to magnetize the bars before they pass in front of the magnetic transducer device DTM for detecting their presence. In present day practice the latter is preferably formed by magnetoresistive elements $MR_1$, $MR_2 \ldots MR_n$ for detecting the presence of the magnet in bars $BA_n$, n being equal to 2. A device similar to DTM employing two magnetoresistors is described in the above-mentioned publication (IEEE Transactions on Magnetics).

The magnetoresistive elements $MR_1, MR_2 \ldots MR_n$ are deposited on the same substrate S of electrically insulating material. Their length L is greater than the width l of the reading track PL. The distance between the elements $MR_1, MR_2 \ldots MR_n$ is equal to d. The elements preferably have the same resistance R and identical coefficients of magnetoresistance $\Delta R/R$. The ends of the elements are connected to the same electrical current generator (not shown in FIG. 1) and a current I flows through them in the direction of their axial length L (see FIG. 1b).

As can be seen in FIGS. 1a and 1b, the elements $MR_1, MR_2 \ldots MR_n$ are subjected to the magnetic leakage field H of the bars, whose principal lines of force each appear as broken lines in FIG. 1a. This magnetic leakage field represented by the H arrow in FIG. 1b is perpendicular to the axial length L of the elements $MR_1, MR_2 \ldots MR_n$ and causes an electrical signal of voltage $\Delta V$ to appear at the terminals of each of the elements, with $\Delta V = I\Delta R$.

Consideration will first be given to a magnetic transducer device $DTM_1$ having only a single magnetoresistive detecting element. In accordance with the invention, and as can be seen in FIG. 2, the magnetoresistive detecting element 1 has associated with it a compensating magnetoresistive element 2 which is arranged close to member 1, but off the reading track PL. For technical reasons, it is preferable for the members 1 and 2 to be identical, i.e. to be of the same length L and resistance R and to have the same coefficient of magnetoresistance $\Delta R/R$ and to be deposited on the same substrate, and to connect the members 1 and 2 to the terminals of the same electrical current generator (not shown in FIG. 2) so that they carry the same current I.

The magnetoresistive detecting element 1 in the reading track PL is subjected to the magnetic leakage field H of the magnetic ink bars and to the sum $\Sigma_1 H_P$ of the magnetic and electromagnetic interference fields other than the magnetic leakage field H of the bars which are situated around it. The compensating magnetoresistive element 2, on the other hand, is subjected only to the sum $\Sigma_2 H_P$ of the magnetic interference fields made up by the fields other than field H which are situated around it. Virtually, $\Sigma_1 H_P = \Sigma_2 H_P$.

For each bar which passes above the transducer device $DTM_1$, there appears at the terminals 3 and 4 of the magnetoresistive element 1 an electrical signal of voltage $\Delta V_1 = V_S + {}_1V_P$, $\Delta V_S$ being the signal representing the voltage across terminals 3 and 4 due to the magnetic leakage field H of the bar. $\Delta_1 V_P$ being the signal representing the voltage across terminals 3 and 4 due to the effect of the magnetic interference field $\Sigma H_p$ on the element 1.

At the terminals 5 and 6 of the compensating magnetoresistive element 2 appears a voltage $\Delta_2 V_P$ which is due to the effect of the interference magnetic fields on this element. $\Delta_1 V_P$ is practically equal to $\Delta_2 V_P$, normally to within a few percent by virtue of the positioning of element 2 outside the leakage field of the bars. It is then only necessary to associate with elements 1 and 2 an electronic differential amplifier circuit (not shown), which receives the two voltages $\Delta V_1$ and $\Delta_2 V_P$ at its input terminals, to obtain from its output a voltage which is directly proportional to $\Delta V_S$. In this way the magnetic transducer device according to the invention virtually prevents interference magnetic fields from having any effect on the signal for detecting the presence of the bars.

FIG. 3 shows another embodiment of the invention which includes two identical magnetoresistive elements 11 and 12 and a compensating single magnetoresistive element 13. The single element 12 is similar to elements 11 and 12 in its material composition, width, thickness and coefficient of magnetoresistance, but is only half as long. This means that its resistance is only half as great. The resistance of elements 11 and 12 is R and their length is L.

The two magnetoresistive elements 11 and 12 are connected in parallel to the terminals of the same electrical current generator (not shown in FIG. 3) and in series with element 13. Because of this, if element 13 carries a current I, elements 11 and 12 carry a current I/2.

When a bar passes in front of elements 11 and 12, they are subjected to the magnetic field H of the bar and to interference magnetic fields $\Sigma H_p$, element 13 being subject only to the fields $\Sigma H_p$.

The voltages $\Delta V_{P1}, \Delta V_{P2}, \Delta V_{P3}$ due to the effect of the interference fields $\Sigma H_P$ on elements 11 to 13, which appear at terminals 14 and 15 of element 11, terminals 16 and 17 of element 12, and terminals 18 and 19 of element 13, are as follows, if, for example, it is assumed that their coefficient of magnetoresistance is equal to 2%:

$$\Delta V_{P1} = \Delta V_{P2} = 2\% \times R \times \tfrac{1}{2} = R1/100.$$

$$\Delta V_{P3} = 2\% \times (R/2) \times 1 = R1/100.$$

thus:

$$\Delta V_{P3} = \Delta V_{P1} = \Delta V_{P2}.$$

Then, as in the case of transducer device $DTM_1$, it is merely necessary, for example, to apply the generated voltages $\Delta V_{P3}$ and $\Delta V_{P1}$ on the one hand, and $\Delta V_{P3}$ and $\Delta V_{P2}$ on the other hand, to the inputs of two differential amplifiers. The two inputs to each differential amplifier are subtracted to obtain at the outputs of the latter, bar-detection voltages $\Delta V_{S1}$ and $\Delta V_{S2}$ from which any noise signal due to the effect of interference magnetic fields has been moved.

It is clear that without thereby exceeding the scope of the invention, the elements 11, 12 and 13 could have different characteristics (such as resistance per unit length, coefficient of magnetoresistance, length L, etc.), the important feature being that elements 11, 12 and 13 are subject to the same magnetic interference fields such that $$\Delta V_{P3} = \Delta V_{P1} = \Delta V_{P2}.$$

always applies.

It is clear that the technical considerations and theory of operation as described for transducer devices $DTM_1$ and $DTM_2$ would also apply to devices $DTM_3, DTM_4, DTM_n$ having three, four, and n magnetoresistive elements for detecting the presence of bars. Thus, in the case of a device $DTM_3$ having three detecting elements whose resistance is R, whose length is L and whose coefficient of magnetoresistance is $\Delta R/R$, the resistance of the compensating magnetoresistance element would be R/3 and its length L/3 (for a coefficient of magnetoresistance equal to $\Delta R/R$).

The production of the device $DTM_2$ according to the invention will be better understood if a description of the process of manufacture is given, this being illustrated by FIGS. 4 and 5 and comprising the following steps:

(1) First Step

A first layer 21 of silicon monoxide (chemical formula SiO) is deposited on a substrate 20 of an electrically insulating material which is a good conductor of heat, such as glass, ceramic or alumina. This produces an electrically insulating surface which also allows a good adhesion of the layers which are deposited subsequently on this surface.

(2) Second Step

The magnetoresistive elements 11, 12 and 13 are then deposited on the layer 21 by a known technique, such as vacuum evaporation. The three elements are deposited simultaneously so that their geometrical, electrical and magnetic properties will be identical (in particular their length L, thickness, resistance R and coefficient of magnetoresistance). The material selected to form the elements 11, 12, and 13 is preferably a nickel/iron alloy (18% iron and 82% nickel). Their thickness is approximately 1000 Angstroms. In a preferred embodiment of the invention the length L is 6 mm, the length of element 13 being 3 mm. The distance d is equal to 0.5 mm while the distance between the terminal 19 of element 13 and the terminals 14 and 16 of elements 11 and 12 is 1 mm.

(3) Third Step

Two bevels $CH_1$ and $CH_2$ are formed on the substrate 20 as shown in FIG. 4, the two bevels forming an angle of less than 45° with the plane of the upper face of the substrate.

(4) Fourth Step

A conductive layer (of copper, for example) approximately 1 micron thick is deposited on the layer 21 and arranged in such a way as to produce the connections between the various magnetoresistive elements. In this way, connections 22, 23, 24 and 25 are produced, connection 22 being connected to terminal 18 of magnetoresistor 13 and connection 23 being connected to terminal 14 of element 11, terminal 19 of element 13 and terminal 16 of element 12, while connection 24 is connected to terminal 15 of element 11 and connection 25 is connected to terminal 17 of element 12. The connections 22, 24 and 25 extend onto each of the bevels $CH_1$ and $CH_2$ and terminate at respective contacts 26, 27, 28 and 29 each of which are relatively large in area compared to the deposited conductive layer.

(5) Fifth Step

Flexible wires 30, 31, 32 and 33 are attached, by tin-brazing, for example, to contacts 26, 27, 28 and 29, respectively. As can be seen in FIG. 5, which is a sectional view of the substrate taken at the point where contacts 26 and 29 are situated, the blobs of solder 34, 35 do not project above the level of the upper plane P of the substrate 20, to prevent the check C from coming into contact with them when it passes above the magnetoresistive elements 11 to 13.

(6) Sixth Step

A protective layer 36 (not shown in FIGS. 4 and 5 for the sake of clarity by symbolized by an arrow) of $SiO_2$ is deposited on the upper plane P of the substrate. The thickness of this layer is between 1 and 30 microns and covers the magnetoresistive elements, conductive strips and their terminal connections. This layer 36 provides protection for the magnetoresistive elements 11 to 13 against all kinds of chemical or mechanical attack.

The embodiment of magnetic transducer device according to the invention which has been described has particular application for detecting the presence of magnetic ink bars making up magnetic characters on checks, but it will be clear to those skilled in the art that the invention can be applied to the detection of coded magnetic information of any kind and in particular magnetic information recorded on magnetic tapes or strips.

We claim:

1. A method of producing a magnetic transducer comprising:
   depositing a first layer of electrically insulating material on one surface of an electrically insulating substrate;
   depositing magnetoresistive detecting and compensating elements on the layer of electrically insulating material;
   beveling opposite surface portions of the surface of the substrate on which the layer and elements are deposited, selectively depositing a layer of conductive material to form connections between the magnetoresistive detecting and compensating elements, and such that said connections terminate on the bevels to form large contact areas;
   attaching flexible wires to the contact areas and depositing a second protective layer of electrically insulating material on the substrate, the magnetoresistive compensating and detecting elements, and their connections.

2. A method of producing a magnetic transducer as set forth in claim 1 wherein the bevel formed in the opposite face portions is at an angle of less than 45% with the plane of the face of the substrate on which the first insulating material is deposited.

3. A method as set forth in claim 1 or 2 wherein the deposited layer of conductive material is approximately 1 micron thick.

4. A method as set forth in claim 3 wherein said flexible wires are attached to the contact areas by soldering, the height of the solder connection being limited such that it does not extend above said plane of the face of the substrate on which the first insulating material is deposited.

* * * * *